United States Patent
Huang et al.

(10) Patent No.: US 11,132,981 B2
(45) Date of Patent: Sep. 28, 2021

(54) METHOD AND DEVICE FOR PROCESSING DISPLAY INFORMATION

(71) Applicant: Silicon Motion, Inc., Zhubei (TW)

(72) Inventors: DongFang Huang, Shanghai (CN); PingQiang Ning, Shanghai (CN); Arthur Lee, Milpitas, CA (US)

(73) Assignee: Silicon Motion, Inc., Zhubei (TW)

( * ) Notice: Subject to any disclaimer, the term of this patent is extended or adjusted under 35 U.S.C. 154(b) by 0 days.

(21) Appl. No.: 16/712,898

(22) Filed: Dec. 12, 2019

(65) Prior Publication Data
US 2020/0365116 A1 Nov. 19, 2020

Related U.S. Application Data

(60) Provisional application No. 62/848,936, filed on May 16, 2019.

(30) Foreign Application Priority Data

Aug. 2, 2019 (CN) .......................... 201910712971.1

(51) Int. Cl.
  *G09G 5/12* (2006.01)
  *G06F 3/14* (2006.01)
(52) U.S. Cl.
  CPC ............. *G09G 5/12* (2013.01); *G06F 3/1454* (2013.01)
(58) Field of Classification Search
  CPC .. G09G 5/006; G09G 3/2096; G09G 2354/00; G09G 2310/027; G09G 5/00;
  (Continued)

(56) References Cited

U.S. PATENT DOCUMENTS

2004/0080482 A1\* 4/2004 Magendanz .......... G06F 3/1431
  345/100
2010/0077085 A1\* 3/2010 Cohen ................... H04L 65/602
  709/227
(Continued)

FOREIGN PATENT DOCUMENTS

TW       I252425 B     4/2006
TW     200945185 A    11/2009
(Continued)

OTHER PUBLICATIONS

Taiwan Patent Office First Office Action dated Dec. 2, 2020, 6 pages.

(Continued)

*Primary Examiner* — Robert J Michaud
(74) *Attorney, Agent, or Firm* — Umberg Zipser LLP; Ryan Dean

(57) ABSTRACT

The present disclosure disclosed a display information processing device and method suitable for a host system, the method comprises: determining whether specification of interfaces of a plurality of extended display devices connected to extension interfaces conforms to the default specification of interfaces of the host system; calling drivers corresponding to a plurality of extended display devices from the host system to drive the plurality of extended display devices with the specification of interfaces conforming to the default specification of interfaces of the host system; obtaining resolution information from the plurality of extended display devices, respectively; determining a common resolution from the resolution information of the plurality of extended display devices; and outputting display information of a main display device to the plurality of extended display devices based on the common resolution. The present disclosure solves the issue of installing drivers (Continued)

and fix the problem of unsupportive resolution of present techniques.

8 Claims, 3 Drawing Sheets

(58) Field of Classification Search
 CPC ......... G09G 5/363; G06F 3/0416; G06F 3/14; G06F 3/0454; G06F 3/0415; G06F 3/0423
 See application file for complete search history.

(56) References Cited

U.S. PATENT DOCUMENTS

| | | |
|---|---|---|
| 2012/0050136 A1* | 3/2012 | Muklashy ............ G06F 3/1454 345/1.1 |
| 2012/0242893 A1 | 9/2012 | Akitomo |
| 2014/0354665 A1 | 12/2014 | Fullerton et al. |
| 2015/0364108 A1 | 12/2015 | Choi |

FOREIGN PATENT DOCUMENTS

| | | |
|---|---|---|
| TW | 201222402 A | 6/2012 |
| TW | 201327150 A | 7/2013 |
| TW | I410859 B | 10/2013 |
| TW | 201840202 A | 11/2018 |

OTHER PUBLICATIONS

Taiwan Patent Office Second Office Action, dated Apr. 12, 2021, 5 pages.

\* cited by examiner

METHOD AND DEVICE FOR PROCESSING DISPLAY INFORMATION

CROSS REFERENCE TO RELATED APPLICATION

This application claims the priority benefit of provisional application Ser. No. 62/848,936 filed on May 16, 2019, and Chinese Patent Application Serial Number 201910712971.1, filed on Aug. 2, 2019, the full disclosure of which is incorporated herein by reference.

BACKGROUND

Technical Field

The present disclosure relates to the technical field of display devices, and more particularly to display devices supporting the same resolution to display content to multiple display devices.

Related Art

A conventional onboard display device or a display device having a Universal Serial Bus (USB) interface (hereinafter referred to as a "USB display device") has the following disadvantages. For self-developed display devices, conventional traditional solution providers need to install their own developed drivers on these self-developed display devices to achieve related functions. This would increase the insecurity of the system. While logging in the system with under the guest account, the authorities of users are limited by the operating system. In general, installing drivers for devices requires an administrator account and password to be inputted, or it may not be able to successfully install the driver due to restrictions by authorities. If the motherboard has enabled the Secure Boot mode, the system would impose stricter restrictions on the installation of drivers.

With the conventional solutions for an application scenario where multiple display devices are used to display the same content, the copy mode requires to be manually set for the extension of the content displayed. Such matter would increase the complexity of the operation of the display for some application scenarios.

Regardless of the conventional onboard display device or USB display device is being used, the operating system will be very likely to automatically switch the resolution of windows desktop followed by the setting of the resolution simultaneously support by the main desktop and the display device being copied if the external display device being copied does not support the resolution of the current desktop while copying a windows desktop, in this way, it usually causes the black desktop border on both sides of the main desktop after the resolution being switched, which makes it difficult to display in full-screen.

SUMMARY

The present disclosure provides a method and device for processing display information to solve the issue that the driver needs to be installed and the resolution is not supported when the display is extended.

In one embodiment, the information processing method suitable for a host system of the present disclosure comprises: determining whether specification of interfaces of a plurality of extended display devices connected to extension interfaces conforms to the default specification of interfaces of the host system, calling drivers corresponding to a plurality of extended display devices from the host system to drive the plurality of extended display devices with the specification of interfaces conforming to the default specification of interfaces of the host system, respectively obtaining resolution information from the plurality of extended display devices, determining a common resolution from the resolution information of the plurality of extended display devices and outputting display information of a main display device to the plurality of extended display devices based on the common resolution.

In one embodiment, the information processing device suitable for a host system of the present disclosure comprises: a processor, a main interface communicatively connected to the processor and optionally connected to a main display device, a plurality of extension interfaces respectively and communicatively connected to the processor, a memory communicatively coupled to the processor, wherein the memory stores instructions executable by the processor. When the instructions are executed by the processor while the plurality of extension interfaces are connected to a plurality of extended display devices, such that the processor is able: to determine whether the specification of interfaces of the plurality of extended display devices connected to extension interfaces conforms to the default specification of interfaces of the host system, to invocate drivers corresponding to the plurality of extended display devices from the host system to drive the specification of interfaces to conform to the plurality of extended display devices, to respectively obtain resolution information from the plurality of extended display devices, to determine a common resolution from the resolution information of the plurality of extended display devices, and to output display information of the main display device to the plurality of extended display devices based on the common resolution.

The disclosed method and device for processing display information of the present disclosure solve the technical issue of installing drivers by providing an effective solution that extending display devices to be used without installation of drivers, given that an enhanced system safety by neither copying/installing any files nor modifying system registry options from the disk directory of the host system. Also, the disclosed method and device for processing display information of the present disclosure can automatically adjust the optimal resolution for display according to the resolution of the connected display devices, thus solving the problem that the resolution of present techniques does not support the devices.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
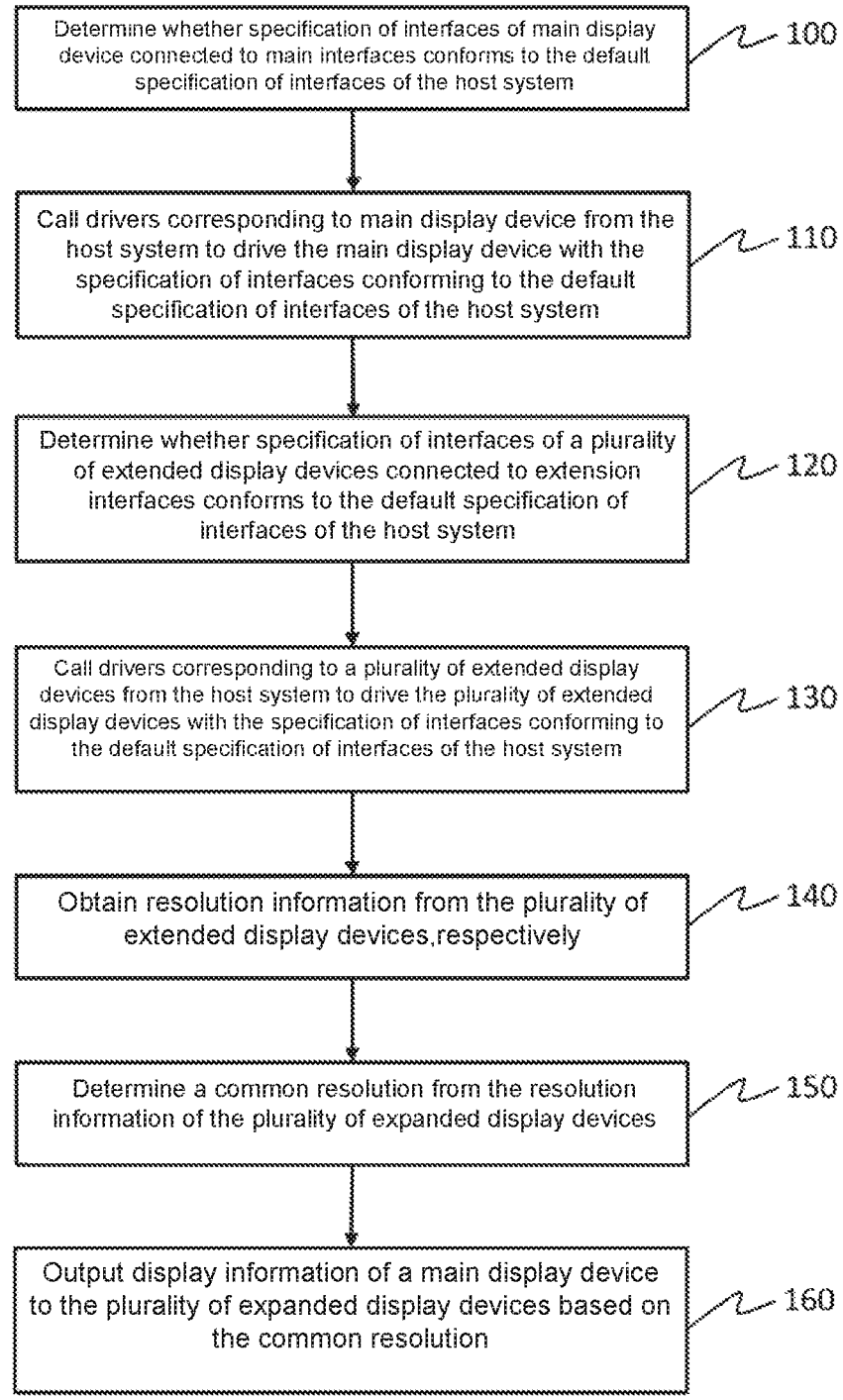
FIG. 1 is a flow chart of a display information processing method of the present disclosure.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

The present disclosure realizes a simultaneous one-to-many copying of a system desktop without additionally installing any user state or kernel mode driver based on a display device such as a USB bus, thereby the security and the usability of a system are sufficiently improved.

Referring to FIG. 1, a flow chart of a display information processing method of the present disclosure, the display information processing method is applied to the display information processing device, and the display information processing device might be a display card or the like disposed onto the host system. The hardware configuration of the host system or the display information processing device will be explained in the following description.

In one embodiment, the display information processing device is configured with a main interface and a plurality of extension interfaces, in that the main interface is connected with a main display device, and the plurality of extension interfaces is connected to a plurality of extended display devices which could possibly indicate that every single extension interface is connected to an extended display device, or maybe only a few of the extension interfaces are connected to extended display devices, or maybe there is only one extension interface is connected to an extended display device.

While the host system is connected to the main display device, the system determines whether specification of interfaces of the main display device connected to the main interface conforms to the default specification of interfaces of the host system (step 100) followed by calling drivers corresponding to the main display device from the host system to drive the main display device with the specification of interfaces conforming to the default specification of interfaces of the host system (step 110).

While a plurality of extended display devices is connected to the plurality of extension interfaces, the system will determining whether specification of interfaces of a plurality of extended display devices connected to extension interfaces conforms to the default specification of interfaces of the host system (step 120) followed by calling drivers corresponding to a plurality of extended display devices from the host system to drive the plurality of extended display devices with the specification of interfaces conforming to the default specification of interfaces of the host system (step 130).

After the drivers are installed, the system respectively obtains resolution information from the plurality of extended display devices 140) followed by determining a common resolution from the resolution information of the plurality of extended display devices (step 150). In the present embodiment, the common resolution is determined by an intersection of the resolution information of the plurality of extended display devices.

Finally, the display information of the main display device is outputted to the plurality of extended display devices based on the common resolution (step 160).

Figure 2:
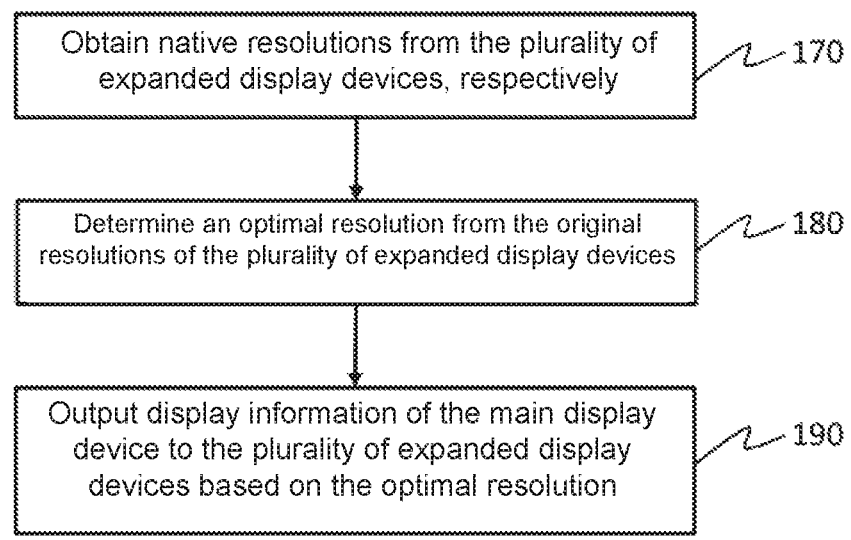
FIG. 2 is another flow chart of the display information processing method of the present disclosure.

FIG. 2 is another flow chart of the display information processing method of the present disclosure. When the common resolution fails to be determined by the resolution information of the plurality of extended display devices at step 150, native resolutions are respectively obtained from the plurality of extended display devices (step 170). An optimal resolution is then determined from the native resolutions of the plurality of extended display devices (step 180), followed by the outputting of display information of the main display device to the plurality of extended display devices based on the optimal resolution (step 190), In one embodiment, the optimal resolution is the lowest resolution of the native resolutions of the plurality of extended display devices.

According to the display information processing method of the present disclosure, the connected display device is reported to the operating system of the host system as a compatible device. Therefore, for example, the winusb.sys program can be automatically loaded as a functional driver, and the hardware manufacturer does not need to provide the INF file for the display device, making the installation process much simpler. INF is the abbreviation of Device INFormation File, a file format introduced by Microsoft Corporation for hardware device manufacturers for the release of drivers, which contains information or scripts of hardware devices to control hardware operations. The INF file indicates how the hardware driver should be installed into the system, where the source files are, which folder to install, how to add relevant information to the registry, and etc.

Also, it has been comprehensively considered that the display information processing method is able to cover the various usage scenarios of copying the same screen. By performing the disclosed display information processing method, the multi-display devices can be copied without copying the display setting panel of each display device like that in the conventional solutions.

Figure 3:
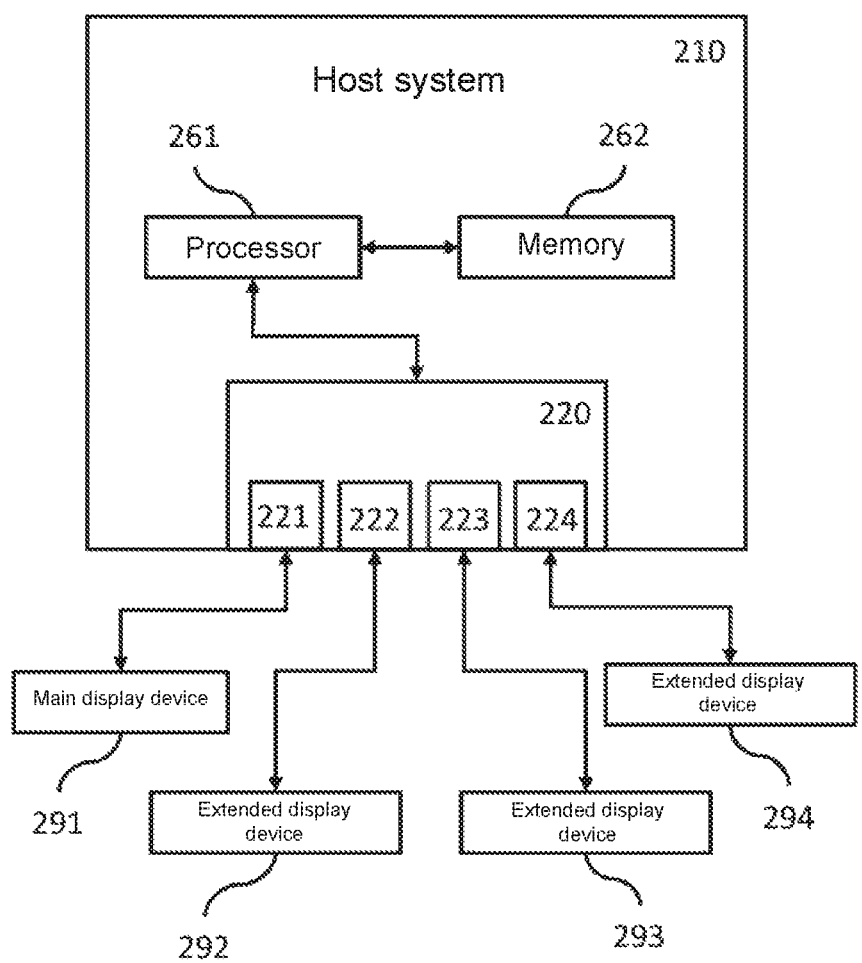
FIG. 3 is a schematic diagram of the system of the display information processing device of the present disclosure.

FIG. 3 is a schematic diagram of the system of the display information processing device of the present disclosure, showing the application scenario of the extended display device. The general system comprises a host system 210, a display information processing device 220, and a plurality of display devices comprising a main display device 291 and extended display devices 292, 293 and 294 which can synchronously display the content displayed by the main display device 291. The quantity of extended display devices 292, 293 and 294 is only exemplary and is not intended to limit the quantity of extended display devices that can be extended. In the present application scenario, it is necessary to install the drivers of extended display devices 292, 293 and 294 in the host system 210. However, the present disclosure does not need to install any driver. As long as the extended display devices 292, 293 and 294 are connected to the display information processing device 220 of the host system 210, the content displayed by the main display device 291 can be automatically synchronized.

The host system 210 of FIG. 3 can be a personal computer, a laptop PC, a tablet computer, and etc. The host system 210 of the present disclosure may also be electronic product such as a mobile phone, a digital camera, or a digital camcorder, as the system allows. The main solution of the present disclosure is the display information processing device 220, thus the unnecessary components in the host system 210 are omitted.

The display information processing device 220 comprises a processor 261 and a memory 262 communicatively coupled to the processor, in which the memory 262 stores instructions executable by the processor 261. The processor 261 and the memory 262, and the main interface and the plurality of extension interfaces may be physically connected by means of bus or other ways.

In one embodiment, the memory 262 disposed in the display information processing device 220 stores firmware or software that implements the technical solution of the present disclosure. The memory 262 is used as a non-transient state computer-readable storage medium and can be used for storing non-volatile software programs, non-volatile computer-executable programs and modules, such as program instructions or modules corresponding to the display information processing method of the embodiment of the present disclosure. The processor 261 performs data processing of the display information by running non-volatile software programs, instructions or modules stored in the memory 262, that is, the implementation of the display information processing method of the above method embodiment. The memory 262 may also include a high-speed random access memory in addition to non-volatile memory such as at least one magnetic disk storage device, flash memory device, or other non-volatile solid-state storage devices.

Moreover, the display information processing device 220 is further configured with a main interface 221 and a plurality of extension interfaces 222, 223, 224. The quantity of interfaces is only exemplary and is not intended to limit the quantity of interfaces that can be configured by the display information processing device 220. The interfaces can be those conforms to the Universal Serial Bus (USB) specifications. The main display device 291 or the extended display devices 292, 293 and 294 are also configured with interfaces conforming to the specifications of the main interface 221 and the plurality of extension interfaces 222, 223 and 224, for example, interfaces conforming to the Universal Serial Bus (USB) specifications (not shown).

The display information processing device 220 is configured to process the information to be displayed by the host system 210 and output the processed information to the main display device 291 or the extended display devices 292, 293 and 294.

When the main display device 291 is connected to the main interface 221 of the display information processing device 220, the firmware of the information processing device 220 determines whether the main display device 291 conforms to the system default display interface specifications. For default display interface specifications, the display information processing device 220 reports to the host system 210 to notify that the main display device 291 is a compatible display device. A driver corresponding to the display interface of the main display device 291 is stored in the host system 210. After the display information processing device 220 determines that the main display device 291 is a compatible display device, the operating system of the host system 210 designates the corresponding driver as the driver for the main display device 291. Thus, no additional driver for installation is needed when connecting the main display device 291 by applying the techniques of the present disclosure. Taking the USB specification as an example, in the Windows operating system, when the information processing device 220 determines that the main display device 291 is USB compatible, the operating system in the host system 210 assigns the winusb.sys program as the driver for the main display device 291. Therefore, with the techniques of the present disclosure, the main display device 291 can be directly operated without additional driver installation while it is connected to the host system 210.

Also, the extended display devices 292, 293 and 294 can be connected to the display information processing device 220 through the extension interfaces 222, 223 and 224, respectively. While connected, the display information processing device 220 determines whether the extended display device 292, 293 and 294 conforms to the default interface specifications of the system. If yes, the display information processing device 220 reports to the host system, notifying the host system that the extended display devices 292, 293 and 294 are compatible display devices, and assigns corresponding drivers. Similarly, taking the USB specification as an example, in the Windows operating system, when the information processing device 120 determines that the extended display devices 292, 293 and 294 are USB compatible, the operating system of the host system assigns the winusb.sys program as the driver for the extended display devices 292, 293 and 294. Therefore, with the techniques of the present disclosure, the extended display devices 292, 293 and 294 can be directly operated without additional driver installation while they are connected to the host system 210.

Since the resolutions of the extended display devices 292, 293 and 294 may be different, the display information processing device 220 of the present disclosure may further adjust the resolution of the extended display devices 292, 293 and 294 to solve issue caused by resolution adjusting of the extended display devices. After the configuration of the driver is completed, the display information processing device 220 then adjusts the resolution of the extended display devices 292, 293 and 294. Taking the extended display devices 292, 293 and 294 as example, when they need to synchronously display with the main desktop of the main display device 291, the display information processing device 220 respectively obtains resolution information from the extended display devices 292, 293 and 294, in which the resolution information is stored in the extended display device 292, 293 and 294 in the form of a mode list, and is recorded with a resolution that each of the extended display devices 292, 293 and 294 can support. After obtaining the resolution information, the display information processing device 220 obtains a resolution that can be applied to the extended display devices 292, 293 and 294 from the resolutions of the extended display devices 292, 293 and 294. In the embodiment, the common resolution is determined through the intersection of the resolution information by the display information processing device 220, in which the common resolution can be supported by any of the extended display device 292, 293, 294. While the common resolution is obtained, the display information processing device 220 copies the display information of the main display device 291 to the extended display devices 292, 293 and 294 based on the common resolution for display.

If the resolution applicable to the extended display devices 292, 293 and 294 cannot be obtained, that is, the common resolution cannot be obtained, the display information processing device 220 will then acquire the native resolution of the extended display devices 292, 293 and 294. The optimum native resolution is then set for the extended display devices 292, 293 and 294. In the embodiment, the display information processing device 220 can obtain native resolutions from the Extended Display Identification Data (EDID, the EDID information) of the extended display devices 292, 293 and 294. Furthermore, the display information processing device 220 scales the desktop image based on the smallest resolution of the extended display devices 292, 293 and 294.

For example, when the display information processing device 220 fails to obtain the common resolution, it will acquire native resolutions of the extended display devices 292, 293 and 294. When the native resolution of the extended display device 292 is 1080p (1920>1080), the native resolution of the extended display device 293 is 2 k (2048×1080), and the native resolution of the extended display device 294 is 1280×1024, the display information processing device 220 adjusts the resolutions of the extended display devices 292, 293 and 294 to 1280×1024 with the lowest resolution as the best resolution and copy the display information of the main display device 291 to the extended display devices 292, 293 and 294 based on a resolution of 1280×1024 for displaying.

The display information processing device of the present disclosure is a device reporting to the operating system of the host system about the compatibility of the connected display device, and thus, for example, the winusb.sys program can be automatically loaded as a functional driver. So the hardware manufacturer does not need to provide INF files to the display device, making the installation process much easier. Also, it has been comprehensively considered that the display information processing devices are able to cover the various usage scenarios of copying the same screen. By the disclosed display information processing devices, the multi-display devices can be copied without copying the display setting panel of each display device like that in the conventional solutions. The disclosed method and device for processing display information of the present disclosure solve the technical issue of installing drivers by providing an effective solution that extending display devices to be used without installation of drivers, given that an enhanced system safety by neither copying/installing any files nor modifying system registry options from the disk directory of the host system.

Also, the disclosed method and device for processing display information of the present disclosure can automatically adjust the optimal resolution for display according to the resolution of the connected display devices, thus solving the problem that the resolution of present techniques does not support the devices.

All or part of the steps of the method described herein can be implemented by computer programs, such as an operating system of a computer, a driver of specific hardware in a computer, or a software program. In addition, other types of programs, as shown above, can also be implemented. Those skilled in the art can write the method of the embodiment of the present disclosure into a program, which will not be described here. The programs implemented in accordance with the method of the embodiments of the present disclosure may be stored in a suitable computer-readable data carrier, such as a DVD, a CD-ROM, a USB, a hard disk, or a network-accessible (e.g, the Internet, or other suitable carriers) webserver.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A display information processing method suitable for a host system, executed by a display information processing device, comprising:
   determining whether specification of interfaces of a plurality of extended display devices connected to extension interfaces conforms to the default interface specifications of the host system;
   calling drivers corresponding to a plurality of extended display devices from the host system to drive the plurality of extended display devices with the specification of interfaces conforming to the default interface specifications of the host system;
   obtaining resolution information from the plurality of extended display devices, respectively;
   determining a common resolution from the resolution information of the plurality of extended display devices and outputting display information of a main display device to the plurality of extended display devices based on the common resolution, and
   wherein the common resolution is determined by an intersection of resolutions that each of the plurality of extended display devices support and are recorded in the resolution information; and when the common resolution failing to be determined by the resolution information of the plurality of extended display devices, obtaining native resolutions from the plurality of extended display devices respectively, determining an optimal resolution from the native resolutions of the plurality of extended display devices, and outputting display information of the main display device to the plurality of extended display devices based on the optimal resolution, wherein the optimal resolution is the lowest resolution of the native resolutions of the plurality of extended display devices.

2. The display information processing method according to claim 1, comprising:

determining whether specification of interface of a main display device connected to a main interface conforms to the default specification of interface of the host system; and calling drivers corresponding to the main display device from the host system to drive the main display device with the specification of the interface conforming to the default specification of interfaces of the host system.

3. The display information processing method according to claim 2, wherein the main interface is a universal serial bus interface.

4. The display information processing method according to claim 1, wherein the plurality of extension interfaces are universal serial bus interfaces.

5. A display information processing device suitable for a host system, comprising:

a processor;

a main interface communicatively connected to the processor and optionally connected to a main display device;

a plurality of extension interfaces communicatively connected to the processor, respectively; and a memory communicatively coupled to the processor, wherein the memory stores instructions executable by the processor;

wherein the instructions are executed by the processor while the plurality of extension interfaces are connected to a plurality of extended display devices, such that the processor is able to:

determine whether specification of interfaces of the plurality of extended display devices connected to extension interfaces conforms to the default interface specifications of the host system;

invocate drivers corresponding to the plurality of extended display devices from the host system to drive to the plurality of extended display devices with the specification of interfaces conforming to the default interface specifications of the host system;

obtain resolution information from the plurality of extended display devices, respectively;

determine a common resolution from the resolution information of the plurality of extended display devices and output display information of the main display device to the plurality of extended display devices based on the common resolution, wherein the common resolution is determined by an intersection of resolutions that each of the plurality of extended display devices support and are recorded in the resolution information; and obtain native resolutions from the plurality of extended display devices respectively, determine an optimal resolution from the native resolutions of the plurality of extended display devices, and output display information of the main display device to the plurality of extended display devices based on the optimal resolution when the common resolution fails to be determined by the resolution information of the plurality of extended display devices, wherein the optimal resolution is the lowest resolution of the native resolutions of the plurality of extended display devices.

6. The display information processing device according to claim 5, wherein the instructions are executed by the processor while the main interface is connected to the main display device, then the processor is able to:

determine whether specification of interface of the main display device connected to the main interface conforms to the default specification of interface of the host system; and to invocate drivers corresponding to the main display device from the host system to drive the main display device with the specification of the interface conforming to the default specification of interfaces of the host system.

7. The display information processing device according to claim 5, wherein the main interface is a universal serial bus interface.

8. The display information processing device according to claim 5, wherein the plurality of extension interfaces are universal serial bus interfaces.

* * * * *